UNITED STATES PATENT OFFICE 2,432,223

PROCESS FOR THE ELIMINATION OF MAGNESIUM FROM INSOLUBLE ALKALINE EARTH ACONITATES

Joseph A. Ambler and Earl J. Roberts, New Orleans, La., assignors to the United States of America as represented by the Secretary of Agriculture No Drawing. Application September 10, 1946, Serial No. 696,021

6 Claims. (Cl. 260—537)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the recovery of aconitic acid from its alkaline earth salts precipitated from certain plant juices and is an improvement in the process disclosed in United States Patent No. 2,345,079, granted to E. K. Ventre, et al.

In the crystalline alkaline earth aconitates separated from plant juices by the procedure set forth in United States Patent Nos. 2,280,085 and 2,359,537, both granted to E. K. Ventre, et al., magnesium is present in varying proportions, generally from 1 to 3 percent and replaces a chemically equivalent amount of calcium in the insoluble salt, tricalcium aconitate hexahydrate, $Ca_3Acon_2.6H_2O$ (Ambler, Turer and Keenan. J. Am. Chem. Soc. 67, 1 (1945)). The presence of magnesium in these aconitates is a disadvantage in the subsequent recovery of aconitic acid from them and necessitates, in the process set forth in the above mentioned United States Patent No. 2,345,079, the crystallization of magnesium sulfate as one step in the process for the efficient recovery of aconitic acid.

The objects of this invention are the elimination of the magnesium from the alkaline earth aconitates and the conversion of said aconitates to tricalcium aconitate trihydrate, $$Ca_3Acon_2.3H_2O$$

whereby the crystallization of magnesium sulfate in the subsequent recovery of aconitic acid is completely eliminated. A further advantage lies in the fact that in the process, the percentage of aconitic acid in the insoluble salt is increased by about 6 percent in consequence of the change from the hexahydrate to the trihydrate of tricalcium aconitate.

When air dried, the crystalline alkaline earth aconitates separated from plant juices and other liquids contain six molecular equivalents of water of hydration. When this air-dried material is heated to constant weight at 140° to 150° C., four of the six molecular equivalents of water of hydration are volatilized (Ambler, et al.), and, we now find, the crystalline structure of the salt is destroyed so that it becomes a fine powder. The time necessary for this change depends on the type and efficiency of the drying apparatus and on the weight of the aconitate heated.

Whereas the crystalline hexahydrate shows no indication of being a physical mixture of insoluble calcium aconitate with soluble magnesium aconitate, in that it is impossible to separate magnesium aconitate by leaching with water or to react it with calcium chloride solution, the dehydrated powder resulting from the removal at 140° C. of four molecular proportions of water, called herein the dihydrate, acts like a physical mixture of the lower hydrates of calcium and magnesium aconitates, in that the magnesium aconitate can be leached out in part by hot water and can be reacted with hot calcium chloride solution, whereby the magnesium is completely displaced by calcium and one molecular equivalent of water is taken up, so that the insoluble material left is magnesium free and has the composition of tricalcium aconitate trihydrate, $Ca_3Acon_2.3H_2O$. We find that only a part of the magnesium is removed by leaching with hot water, and only by the use of hot calcium chloride solution have we succeeded in eliminating the magnesium completely. The following equations show the chemical reactions involved in the process:

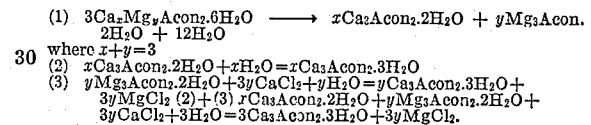

The following examples of our invention are described, although it is not our intention to limit the process in any way to the periods of time, or the concentrations or volumes of calcium chloride solutions cited in relation to the weights of alkaline earth aconitate treated, said relationships being subject to wide variations.

Air-dried crystalline alkaline earth aconitate which contained 17.85 percent calcium, 1.90 percent magnesium, 59.4 percent aconitic acid, and which had been separated from sorgo juices as described in United States Patent No. 2,280,085, was heated at 140° C. to constant weight (over night) and lost 11.5 per cent of its weight. It was then a fine powder containing 20.00 percent calcium, 2.07 percent magnesium, and 67.0 percent aconitic acid. 20 parts of anhydrous calcium chloride were dissolved in 100 parts of water, the solution heated to boiling, and 5 parts of the said powder were added. The suspension was kept in a steam bath for 30 minutes, after which the insoluble material was collected by filtration.

The filtrate from another identical treatment was heated to boiling, a fresh charge of 5 parts of the alkaline earth aconitate powder was added, and the suspension was treated and filtered as before. This was repeated until the calcium chloride solution had been used for five successive charges of alkaline earth aconitate. The insoluble residues were washed with hot water to remove chlorides and air dried. For analysis, they were heated at 140° C. to constant weight. The analyses are given in Table I. The decrease in effectiveness shown in the last three treatments is to be attributed to the accumulation of magnesium in the calcium chloride solution. The filtrate from the fifth batch, which may well be considered as exhausted, contained calcium and magnesium in the ratio of 20:1. The air-dried magnesium containing residue from the fourth batch, without being heated at 140° C., was treated with a fresh solution of calcium chloride as before, whereby all the magnesium was eliminated, showing that elimination of magnesium may be effectively accomplished by percolation processes.

Table

|  | Per cent Ca | Per cent Mg | Per cent H₃Acon | Per cent loss in weight[1] |
|---|---|---|---|---|
| Heated aconitate | 20.00 | 2.07 | 67.0 |  |
| Single batch | 23.50 | 0.00 | 66.7 | 5.1 |
| Successive batches: |  |  |  |  |
| 1st | 23.90 | 0.00 |  | 2.6 |
| 2nd | 24.00 | 0.00 |  | 0.0 |
| 3rd | 23.00 | 0.98 |  | 1.6 |
| 4th | 22.18 | 1.49 |  | 0.3 |
| 5th | 21.93 | 1.55 |  | 2.2 |
| 4th batch releached | 23.00 | 0.00 |  | 5.0 |

[1] Loss is partly manipulative. After the 1st batch, losses in subsequent successive batches are mainly manipulative.

A boiling solution of 60 parts of anhydrous calcium chloride in 100 parts of water dissolved the dehydrated alkaline earth aconitate in large part. When this solution was diluted with hot water, tricalcium aconitate trihydrate separated in crystalline form.

The magnesium-free calcium aconitates may be used for the preparation of aconitic acid by the action of sulfuric acid as set forth in United States Patent 2,345,079 without the necessity of separately crystallizing magnesium sulfate during the process.

The exhausted solutions of calcium and magnesium chlorides contain a small amount of aconitic acid and may be discarded or worked up by known methods for the recovery of the aconitic acid and the alkaline earth chlorides as desired.

The duration of time, the concentrations and proportions in the foregoing descriptions are given by way of illustration of the principles of our invention and are not to be taken as limiting the invention to those specific conditions. Variations in the purity of the alkaline earth aconitates, in their magnesium contents and in types of apparatus used, as well as economic considerations, may dictate deviations from the conditions given in the examples.

Having thus described our invention, we claim:

1. The process of separating magnesium from crystalline, magnesium-containing, calcium aconitate comprising heating the crystalline hexahydrate of said aconitate for a sufficient length of time to cause the crystalline aconitate hexahydrate to lose two-thirds of its water of hydration, so that the crystals disintegrate to a fine powder having the properties of a mixture of lower hydrates of calcium aconitate with magnesium aconitate; treating the said powder with a hot solution of calcium chloride to react with the magnesium aconitate freed by the previous heat treatment, thus producing insoluble tricalcium aconitatetrihydrate and soluble magnesium chloride; digesting the mixture at about 100° C. for a length of time sufficiently long to complete the reaction between the magnesium aconitate and the calcium chloride; and then separating the insoluble tricalcium aconitate trihydrate from the mixture.

2. The process comprising treating a mixture of solids comprising lower hydrates of calcium and magnesium aconitates with a hot solution of calcium chloride to react with the magnesium aconitate content of the mixture, thus producing insoluble tricalcium aconitate trihydrate and soluble magnesium chloride; digesting the mixture at about 100° C. to complete the reaction; and then separating the insoluble tricalcium aconitate trihydrate from the mixture.

3. The process of claim 1, in which the crystalline hexahydrate is heated at a temperature of about 140° to 150° C. to constant weight.

4. A process of reducing the magnesium content of crystalline calcium-magnesium aconitate hexahydrate comprising heating the crystalline hexahydrate to reduce its content of water of hydration and so that the crystals disintegrate, treating said disintegrated crystals with a hot solution of calcium chloride to react with the magnesium aconitate, the disintegrated crystals remaining in the solid phase during said treating.

5. The process of claim 4 in which the solid residues of the calcium chloride treatment are washed with water to remove the chlorides.

6. The process of claim 2 in which the mixture of lower hydrates is obtained by heating crystalline calcium-magnesium aconitate hexahydrate until it disintegrates.

JOSEPH A. AMBLER.
EARL J. ROBERTS.

REFERENCES CITED

The following references are of record in the file of this patent:

UNITED STATES PATENTS

| Number | Name | Date |
|---|---|---|
| 2,345,079 | Ventre et al. | Mar. 28, 1944 |
| 2,359,537 | Ventre et al. | Oct. 3, 1944 |

OTHER REFERENCES

Ventre et al., Ind. Eng. Chem., vol. 38, pages 201–204 (1946).